United States Patent [19]

Steiner

[11] 3,962,814

[45] June 15, 1976

[54] HUMANE TRAP

[76] Inventor: Henry William Steiner, Box 18, Site 19, R.R. No. 1, Dryden, Ontario, Canada

[22] Filed: Aug. 30, 1974

[21] Appl. No.: 502,175

Related U.S. Application Data

[63] Continuation-in-part of Ser. No. 368,720, June 11, 1973, Pat. No. 3,835,576.

[52] U.S. Cl. ................................................. 43/86
[51] Int. Cl.² ........................................ A01M 23/26
[58] Field of Search ............... 43/86, 85, 95, 96, 97

[56] References Cited
UNITED STATES PATENTS

| 901,851 | 10/1908 | Thompson | 43/85 |
| 3,835,576 | 9/1974 | Steiner | 43/86 |

*Primary Examiner*—Louis G. Mancene
*Assistant Examiner*—Peter K. Skiff
*Attorney, Agent, or Firm*—Stanley G. Ade

[57] ABSTRACT

The trap consists of a pair of rings pivotally secured together at one side thereof in juxtaposition one with the other. A tension spring extends between offset portions on each ring and when the rings are substantially concentric one with the other, the spring is fully extended and biassing the rings to the nonconcentric or sprung position whereby an animal may be trapped between the lower portion of one ring and the upper portion of the other ring. The trap is held in concentric or set position either by means of a pan or foot treadle trigger mechanism adjacent the base of the rings or by a swinging trigger mechanism between the upper sides of the rings with the trigger or actuating members extending down across the area defined by the rings. This swinging trigger can operate the trap by movement of an animal through the rings in either direction and the trap can be used on land or in the water as desired. A spring lock strip is provided which holds the rings in the "sprung" position by a ratchet which can only be released by manually disengaging the spring strip from the ratchet.

2 Claims, 10 Drawing Figures

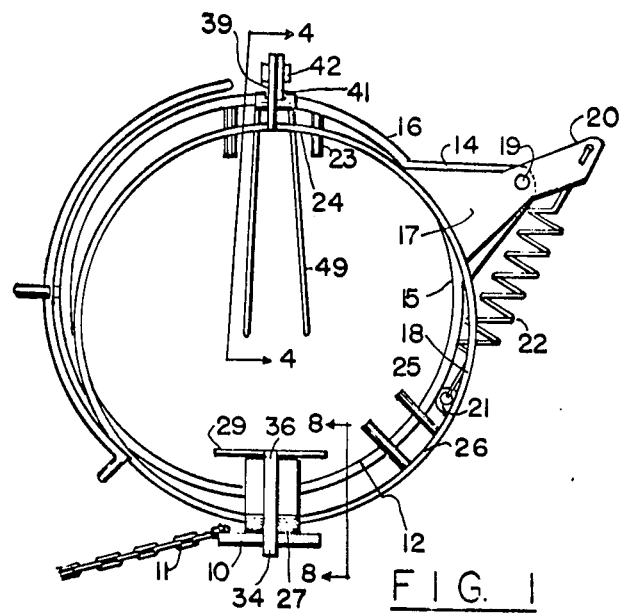

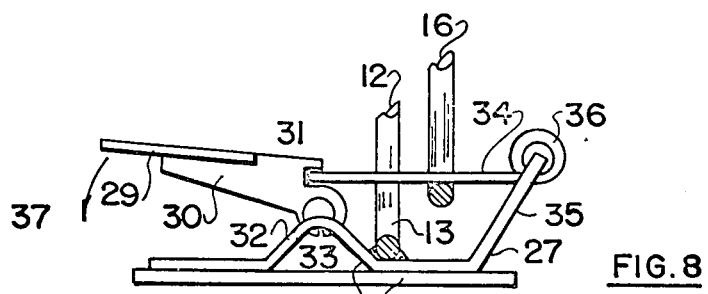
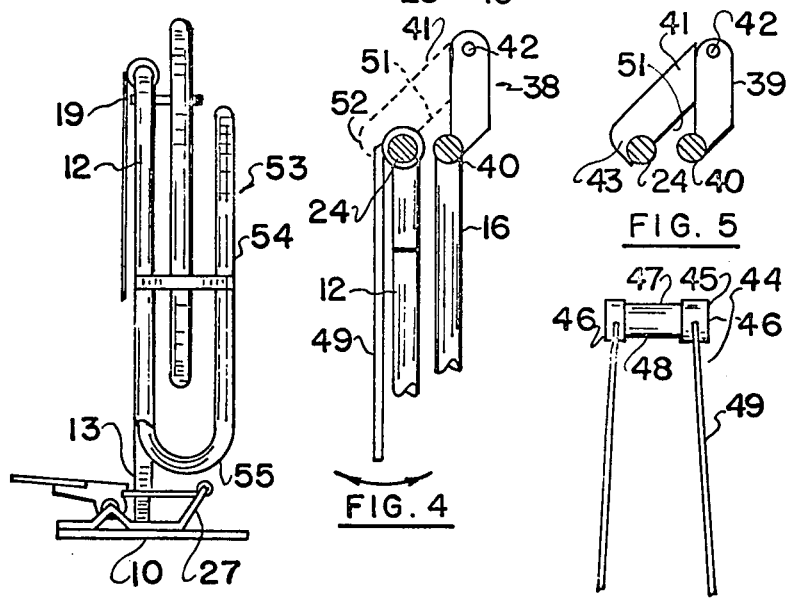
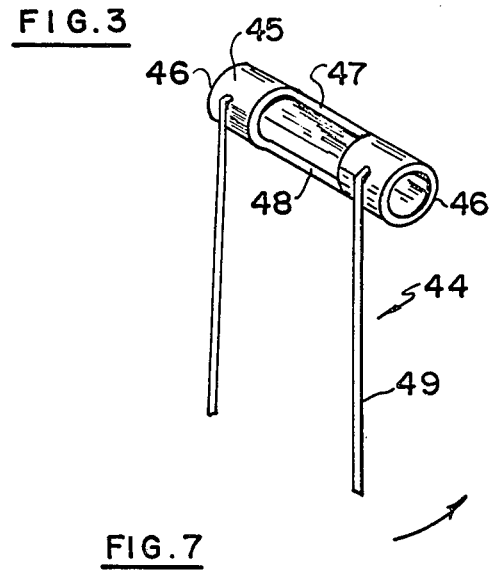

3,962,814

HUMANE TRAP

BACKGROUND OF THE INVENTION

This invention relates to new and useful improvements in humane traps and constitutes a continutation-in-part of my application, Ser. No. 368,720, filed June 11, 1973, now Pat. No. 3,835,576.

Many forms of traps have been designed and normally such traps operate by either a foot treadle machenism or by actuating members or wires extending across the path through which the animal must pass.

Certain animals are better trapped by the foot treadle mechanism and other animals are better trapped by the hanging wire kind of mechanism. Furthermore, the majority of traps operate with animals passing only in one direction and such traps are not always particularly suited for use in both land and water environments.

SUMMARY OF THE INVENTION

The present invention overcomes these disadvantages by using a fixed ring and a movable ring pivotted together at the sides thereof and normally held in the concentric or set position by means of a heavy duty tension spring extending between lugs offstanding from the sides of the rings.

Two methods of actuation are provided - either a treadle mechanism or a hanging wire mechanism and one advantage of the hanging wire mechanism is that it will be actuated by animals passing through the trap in either direction.

The principal object and essence of the invention is therefore to provide a device of the character herewithin described which is suitable for use upon land or water and can be actuated either by a foot treadle or pan mechanism or by a hanging wire mechanism, the latter being particularly suited for use when the trap is used in an underwater environment so that a swimming animal may be caught thereby.

Another object of the invention is to provide a device of the character herewithin described which, when used with the hanging wire trigger mechanism, is adapted to be actuated by an animal swimming through in either direction.

Still another object of the invention is to provide a device of the character herewithin described which is humane in operation inasmuch as the animal's neck or back is broken as soon as the trap is sprung.

Still another object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this inventon relates as this specification proceeds, my invention consists essentially in the arrangement and construction of parts all as hereinafter more particularly described, reference being had to the accompanying drawings in which:

DESCRIPTION OF THE DRAWINGS

FIG. 1 is a front elevation of the device shown in the set position.

FIG. 2 is a view similar to FIG. 1, but showing the trap in the sprung position.

FIG. 3 is a view at right angles from FIG. 1 taken from the left-hand side thereof.

FIG. 4 is an enlarged fragmentary view substantially along the lines 4—4 of FIG. 1, with the latch bar shown in phantom for clarity.

FIG. 5 is a fragmentary view of FIG. 4 showing the latch bar engaged with the movable ring.

FIG. 6 is a front elevation of the second trigger means per se.

FIG. 7 is an isometric view of the trigger mechanism per se of FIG. 6.

FIG. 8 is an enlarged fragmentary view of the first trigger means being a section substantially along the lines 8—8 of FIG. 1.

In the drawings like characters of reference indicate corresponding parts in the different figures.

DETAILED DESCRIPTION

Figure 9:
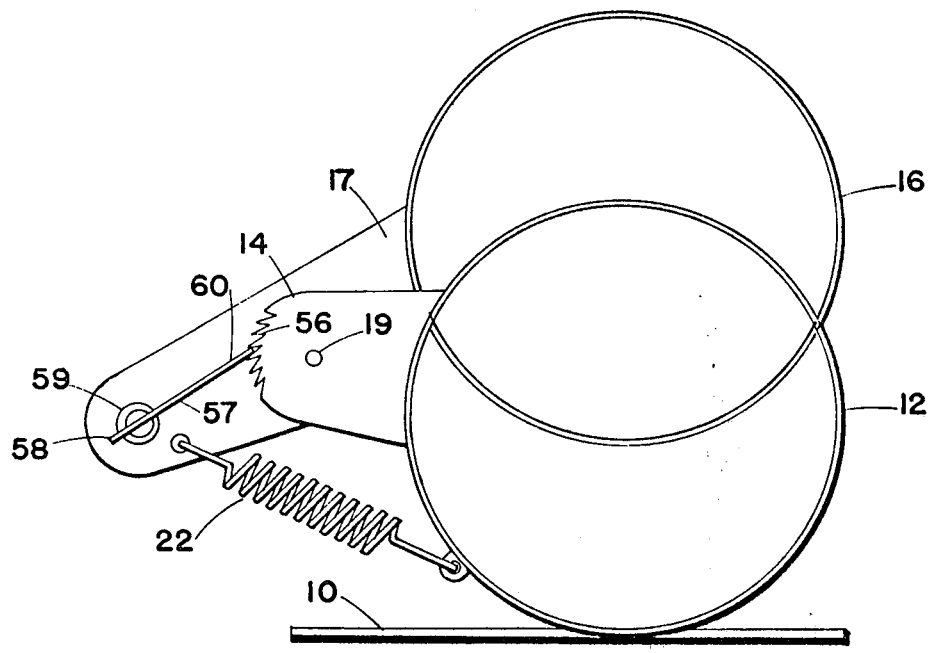
FIG. 9 is a partially schematic view of an alternative embodiment of the trap with the trigger mechanism removed for clarity and showing the lock to hold the trap in the released or sprung position.

Proceeding therefore to describe the invention in detail, reference to the drawings will show that a small rectangular base plate 10 is provided by which the device may be situated on the ground or a supporting surface. In this regard, a chain 11 may be provided attached to the plate 10 and extending therefrom so that it may be anchored to the ground in the usual manner (not illustrated).

A fixed ring 12 is welded to the base plate 10 by the lower side 13 thereof and extends upwardly from the base plate to be situated in a substantially vertical plane when the trap is in the normal position.

An offstanding lug 14 is secured as by welding to one side 15 of the fixed ring and extends outwardly therefrom as clearly shown in FIGS. 1 and 2.

A movable ring 16 is provided having a diameter substantially similar to the fixed ring 12 and this movable ring is also provided with an offstanding lug 17 extending from one side 18 thereof and secured to this side as by welding or the like.

A relatively loose pivot pin 19 extends between the two lugs thus pivotting the movable ring 16 relative to the fixed ring 12 and in this context, the movable ring is also in a vertical plane parallel to the plane of the fixed ring 12 so that the two rings are in juxtaposition one with the other.

An extension 20 is formed on lug 17 and extends outwardly beyond the pivot 19 and a spring anchor ring 21 is secured to the side 15 of the fixed ring below lug 14 as clearly shown in FIG. 2.

A relatively heavy duty tension spring 22 is secured by the ends thereof to the extension 20 and to the spring anchor 21 and normally biasses the movable ring 16 to the uppermost or sprung position relative to the fixed ring 12 as shown in FIG. 2.

When in this position, note should be taken of the relatively blunt piece 23 extending downwardly from the upper side 24 of the fixed ring and complimentary blunt teeth 25 extending upwardly from the lower side 26 of the movable ring so that any animal trapped between the upper side 24 of the fixed ring and the lower side 26 of the movable ring will immediately be killed.

Two means are provided to hold the trap in the set position shown in FIG. 1, under which circumstances spring 22 is fully extended.

FIG. 8 shows details of the first trigger means which consists of an anchor plate 27 welded to the base plate 10 upon the upper side thereof, it being understood that ring 12 is welded to the anchor plate 27 as at 28.

A pan 29 is secured to an actuator 30 which is provided with a detent 31 upon the upper side thereof and this actuator is pivotted to the portion 32 of the anchor plate 27 by curving a tongue 33 through an aperture within the portion 32 (not illustrated) so that the pan pivots freely in a vertical plane.

A trigger latch 34 is pivotted to the offstanding portion 35 of the anchor plate 27 by means of the tongue 36 engaging through an aperture (not illustrated) in this upper portion 35 and this trigger latch normally extends over the lower side 26 of the movable ring when the trap is in the set position and engages the detent 31 which holds the two rings substantially in juxtaposition one with the other with the spring 22 fully extended.

As soon as an animal steps upon the pan 29, it moves downwardly in the direction of arrow 37 thus releasing the detent 31 from the distal end of the trigger latch 34 which enables the spring 22 to move the movable ring rapidly to the position shown in FIG. 2 thus trapping the animal between the two rings as hereinbefore described.

Alternately, the second trigger means collectively designated 38 may be utilized and this second trigger means can of course, be used on land but is particularly suited for use in underwater environments where the animal to be trapped may be swimming.

This second trigger means includes a relatively small anchor lug 39 welded to the upper side 40 of the movable ring 16 and extending upwardly therefrom, a latch bar 41 is pivotted by one end thereof to this anchor lug by means of pivot 42 and this latch bar includes a detent 43 on the distal end thereof. When in the set position, the latch bar detent 43 engages the upper side 24 of the fixed ring and maintains the trap in the set position with the two rings in concentric relationship one with the other and the spring 22 fully extended.

A trigger component collectively designated 44 consists of a cylindrical bearing portion 45 shown in detail in FIGS. 6 and 7 and freely engaging around the upper side 24 of the fixed ring 12.

Part of the circumference of this cylindrical bearing portion is cut away as shown in FIG. 7, between the ends 46 thereof and this cut-away portion is defined in part by the spaced and parallel first and second edges 47 and 48 illustrated in FIGS. 6 and 7. This cut-away portion enables the detent 43 of the latch bar 41 to engage the fixed ring with the detent being situated between the end portions 46 of the cylindrical bearing portion.

In this embodiment, a pair of actuating members taking the form of wires 49 extend downwardly from the cylindrical bearing portion one from each end thereof, but of course a single member can be utilized or, alternatively, more than two members can be utilized.

When in the set position, these actuating members extend downwardly across the area defined by the rings as shown in FIG. 1 so that an animal walking or swimming through the rings will engage the actuating members 49 and move same normal to the plane of the rings and it should be observed that these actuating members will move in either direction depending upon which direction the animal is moving.

If the actuating members 49 are moved in the direction of arrow 50 (with reference to FIG. 7) then the cylindrical bearing portion will rotate upon the fixed ring in the same direction so that edge 47 will engage the latch bar 41 at the point illustrated by reference character 51 in FIG. 5, thus disengaging the latch bar from the fixed ring 12 and releasing the trap to the sprung position.

On the other hand, if the actuating members 49 are moved in the opposite direction to arrow 50, then the lower edge 48 of the cylindrical bearing portion will engage the latch bar at a point illustrated by reference character 52 in FIG. 5, once again disengaging the latch bar from the fixed ring 12 and allowing the spring 22 to close the trap to the position shown in FIG. 2.

Because of the relatively loose pivotal connection 19 between the two rings, means are provided to stop any side ways movement of the movable ring 16 relative to the fixed ring 12 which might jam the operation of the trap and in this connection reference should be made to FIG. 3.

Reference character 53 illustrates the anti-spread bar means consisting of a member 54 which is part of a circle having a diameter similar to the diameter of the rings 12 and 16.

A pair of hoop supports 55 are secured to the fixed ring and extend over the movable ring and are secured to the bar 54. This bar 54 is positioned so that it does not interfere with the movement of the movable ring 16 between the set and sprung positions, but does prevent any sideways movement occurring as this would be restricted by the arcuately curved or partially curved bar 54.

Although the various components have been described and illustrated as being attached either to the fixed ring 12 or the movable ring 16, it will nevertheless be realized that these attachment points can be reversed without interfering with the operation of the trap in any way.

Finally, it should be noted that when the first trigger means is in use the trigger component 49 and latch bar 41 are swung out of position and when the second trigger means is used, the trigger latch 27 is swung out of position so that one does not interfere with the operation of the other.

Figure 10:
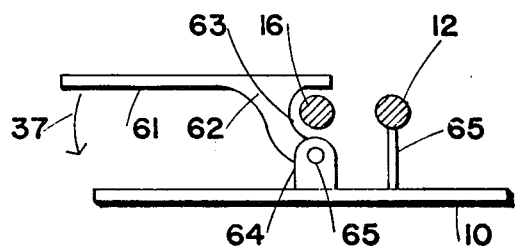
FIG. 10 is a frgmentary side elevation showing an alternative pan type release mechanism.

FIGS. 9 and 10 show improved embodiments and FIG. 9 shows the trap in the sprung position but with the trigger mechanism removed for clarity.

Means are provided to lock the trap in the sprung position and in this regard it will be noted that serrated or ratchet type teeth 56 have been formed on the outer edge of the offstanding lug 14.

A flat leaf spring strip 57 is anchored by one end 58 thereof in an anchor sleeve 59 which is secured to the extension 20 of the lug 17. This anchor sleeve 59 is provided with a slot therein so that the end of the leaf spring may be engaged within the slot and then the two portions of the sleeve embracing the spring can be pinched together to firmly secure the spring strip in position. However, other means can of course be provided to anchor the spring strip in position.

The distal end 60 of the flat spring strip engages the ratchet teeth 56 and these teeth are directed so that when the movable ring 16 moves out of concentricity with the fixed ring 12, the ratchet teeth pass by the end of the spring strip which locks the two rings in the open or nonconcentric position thus preventing an animal from disengaging itself from between the rings.

To release the rings, it is necessary for the end 60 of the flat spring strip to be elevated clear of the ratchet teeth 56 thus enabling the rings to be moved towards the set or concentric position.

FIG. 10 shows a simplified pan trigger release mechanism. A pan 61 is connected to an actuator 62 which is provided with a curved detent portion 63 in one end thereof and this actuator is pivoted to a lug 64 extending up from the base plate 20 by means of pivot pin 65.

The movable ring 16 engages directly within the detent 63 thus holding the rings in concentric relationship one with the other and in this connection, the fixed ring 12 is secured to the base 10 by means of a riser 66 so that the two rings are concentric when in the set position.

Movement of the pan in the direction of arrow 37 will, of course, disengage the detent of the actuator from the movable ring thus enabling the spring 22 to operate the trap as hereinbefore described.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. An animal trap for use on land or in water comprising in combination a base plate, a fixed ring secured to said base plate by the lower side thereof and extending upwardly therefrom to lie in a substantially vertical plane when in use, a movable ring pivotally secured for swinging movement by one side thereof to one side of said fixed ring, said rings being situated in parallel planes and substantially in juxtaposition one with the other, tension spring means operatively connected between said rings normally urging said movable ring out of concentric relationship with said fixed ring and in the sprung position, trigger means operatively connected between said rings to hold said movable ring substantially in concentric relationship with said fixed ring and in the set position, an offstanding lug secured to said fixed ring and extending outwardly therefrom in the same plane as said fixed ring, and an offstanding lug secured to said movable ring and extending outwardly therefrom in the same plane as said movable ring, pivot means securing said lugs together, said lug on said movable ring having an extension beyond said pivot means, spring anchor means on said fixed ring, said tension spring being operatively secured between said spring anchor means and said extension beyond said pivot means, by the ends thereof, and releasable lock means operatively connected between said rings to detachably lock said rings in the sprung position, said releasable lock means including ratchet teeth formed on the edge of one of said offstanding lugs and spring detent means fixedly secured by one end thereof to the other of said offstanding lugs and operatively engaging said ratchet teeth by the other end thereof to hold said rings in the sprung position until said spring detent means is manually disengaged from said ratchet teeth, said spring detent means comprising an elongated leaf spring fixedly secured by one end thereof to the other of said offstanding lugs and operatively engaging said ratchet teeth by the other end thereof.

2. The trap according to claim 1 in which said trigger means includes a pan pivoted to said base plate and extending therefrom upon one side of said ring, said pan including a detent thereon, said movable ring engaging under said detent thereby holding said rings in the set position, downward movement of said pan releasing said detent from said movable ring thereby releasing said trap to the sprung position.

* * * * *